(12) United States Patent
Kumagai et al.

(10) Patent No.: US 9,048,729 B2
(45) Date of Patent: Jun. 2, 2015

(54) STEP-UP/DOWN DC-DC CONVERTER AND SWITCHING CONTROL CIRCUIT

(75) Inventors: Keizo Kumagai, Atsugi (JP); Takashi Hiroshima, Atsugi (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 325 days.

(21) Appl. No.: 13/575,713

(22) PCT Filed: Jan. 17, 2011

(86) PCT No.: PCT/JP2011/050627
§ 371 (c)(1),
(2), (4) Date: Jul. 27, 2012

(87) PCT Pub. No.: WO2011/093155
PCT Pub. Date: Aug. 4, 2011

(65) Prior Publication Data
US 2012/0299568 A1 Nov. 29, 2012

(30) Foreign Application Priority Data
Jan. 28, 2010 (JP) .................................. 2010-016115

(51) Int. Cl.
*H02M 3/158* (2006.01)
*H02M 1/00* (2006.01)

(52) U.S. Cl.
CPC .... *H02M 3/1582* (2013.01); *H02M 2001/0025* (2013.01)

(58) Field of Classification Search
CPC ... H02M 3/156; H02M 3/158; H02M 3/1582; H02M 3/1588; H02M 2001/0025
USPC .......................... 323/259, 268, 271, 282, 288
See application file for complete search history.

(56) References Cited

U.S. PATENT DOCUMENTS 5,402,060 A * 3/1995 Erisman ..................... 323/268
6,147,549 A * 11/2000 Ohno .......................... 327/541
(Continued)

FOREIGN PATENT DOCUMENTS

JP 3-135107 A 6/1991
JP 05161029 A 6/1993
(Continued)

OTHER PUBLICATIONS

Japanese Office Action dated Feb. 4, 2014 (and English translation thereof) in counterpart Japanese Application No. 2010-016115.
(Continued)

*Primary Examiner* — Fred E Finch, III
(74) *Attorney, Agent, or Firm* — Holtz, Holtz, Goodman & Chick PC (57) ABSTRACT

A step-up/down DC-DC converter and switching control circuit are described. According to one implementation, a switching control circuit generates on/off signals of a first switching device supplying a current to a voltage conversion inductor of a step-up/down DC-DC converter and a second switching device receiving a current from the inductor. The switching control circuit includes an error amplifier circuit, an inverter amplifier circuit, a waveform generator circuit, a first voltage comparator circuit, a second voltage comparator circuit, and a voltage generator circuit. An inverting reference voltage supplied to the inverting amplifier circuit is set to an electric potential so as not to fall below a highest electric potential of triangle waves supplied to the first and second voltage comparator circuits.

5 Claims, 5 Drawing Sheets

(56) References Cited

U.S. PATENT DOCUMENTS

| | | | |
|---|---|---|---|
| 6,600,295 B2 | 7/2003 | Kanekawa et al. | |
| 7,180,274 B2 | 2/2007 | Chen et al. | |
| 7,518,349 B2 * | 4/2009 | Xu | 323/282 |
| 7,570,033 B1 * | 8/2009 | Ju | 323/259 |
| 7,737,668 B2 * | 6/2010 | Oswald et al. | 323/259 |
| 8,436,598 B2 | 5/2013 | Miyamae | |
| 2004/0207375 A1 | 10/2004 | Umemoto et al. | |
| 2005/0007089 A1 * | 1/2005 | Niiyama et al. | 323/284 |
| 2007/0057650 A1 | 3/2007 | Umemoto et al. | |
| 2007/0075687 A1 * | 4/2007 | Ishii et al. | 323/225 |
| 2007/0120546 A1 * | 5/2007 | Hagino | 323/282 |
| 2008/0116868 A1 * | 5/2008 | Nishida | 323/282 |
| 2009/0102440 A1 * | 4/2009 | Coles | 323/271 |
| 2009/0134860 A1 | 5/2009 | Umemoto | |
| 2012/0286749 A1 | 11/2012 | Kumagai et al. | |

FOREIGN PATENT DOCUMENTS

| | | | |
|---|---|---|---|
| JP | 07143742 A | 6/1995 | |
| JP | 3440314 B2 | 6/2003 | |
| JP | 2004-320892 A | 11/2004 | |
| JP | 2005033862 A | 2/2005 | |
| JP | 3953443 B2 | 5/2007 | |
| JP | 2008-131746 A | 6/2008 | |
| JP | 2009124877 A | 6/2009 | |

OTHER PUBLICATIONS

International Search Report dated Apr. 19, 2011 issued in International Appln. No. PCT/JP2011/050627.

English translation of an International Preliminary Report on Patentability (IPRP) including Written Opinion dated Jul. 31, 2012 in parent International Application No. PCT/JP2011/050627.

Related U.S. Appl. No. 13/575,731; First Named Inventor: Keizo Kumagai; Title: "Step-Up/Down DC-DC Converter and Switching Control Circuit"; filed: Jul. 27, 2012.

* cited by examiner

STEP-UP/DOWN DC-DC CONVERTER AND SWITCHING CONTROL CIRCUIT

This application is a U.S. National Phase Application under 35 USC 371 of International Application PCT/JP2011/050627, filed Jan. 17, 2011.

TECHNICAL FIELD

The present invention relates to a DC-DC converter that converts a DC voltage and a control circuit of the DC-DC converter and, in particular, relates to a technology that is effectively applicable to a step-up/down DC-DC converter that can step-down or step-up an input voltage and then output the outcome.

BACKGROUND ART

DC-DC converters that convert a variable DC input voltage to a DC voltage of a predetermined electric potential and outputs the converted DC voltage include step-up/down DC-DC converters that can step-up or step-down an input voltage and output the converted DC voltage. Inventions on such conventional step-up/down DC-DC converters are described in, for example, Patent Documents 1 and 2.

Figure 6:
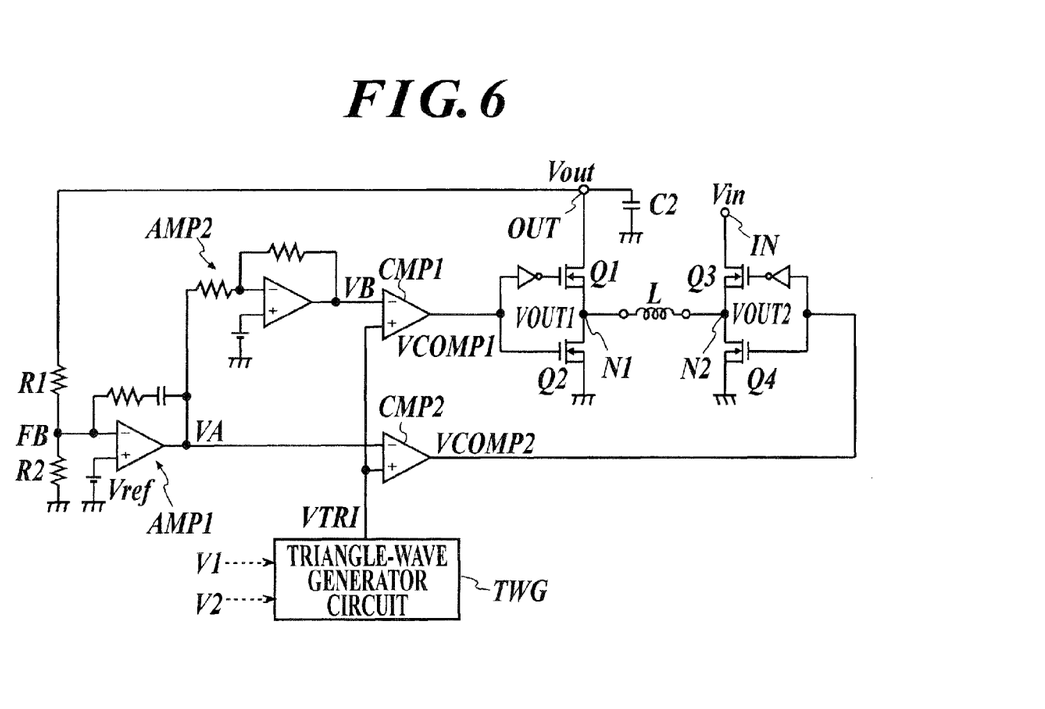
FIG. 6 is a circuit configuration diagram of an example configuration of a conventional step-up/down DC-DC converter (Patent Document 2)

FIG. 6 illustrates the configuration of a step-up/down DC-DC converter disclosed in Patent Document 2. This step-up/down DC-DC converter includes nMOS transistors Q3 and Q4 connected in series to an input terminal receiving a DC voltage Vin supplied from a DC power source, such as a battery, and a grounding point; nMOS transistors Q1 and Q2 connected in series to an output terminal connected to a smoothing capacitor C2 and the grounding point; bleeder resisters R1 and R2 that divides an output voltage Vout to generate a feedback voltage FB; an error amplifier AMP1 that outputs a voltage VA corresponding to the potential difference between the feedback voltage FB and a reference voltage Vref; an inverting amplifier AMP2 that inverts an output VA from the error amplifier; a triangle-wave generator circuit TWG that generates triangle waves VTRI for pulse width modulation (PWM) control of the output voltage; and paired PWM comparators CMP1 and CMP2 that receive the generated triangle waves VTRI and the output VA of the error amplifier AMP1 or its inverted voltage VB.

An inductor (coil) L is connected to both a connection node N1 of the nMOS transistors Q1 and Q2 and a connection node N2 of the nMOS transistors Q3 and Q4, and the nMOS transistor Q2 is turned on/off by the output (PWM pulse) from the PWM comparator CMP1, and the Q4 is turned on/off by the output (PWM pulse) from the CMP2. The nMOS transistor Q1 is turned on/off by an inverting signal output from the PWM comparator CMP1, and the Q3 is turned on/off by an inverting signal output from the CMP2.

Figure 7:
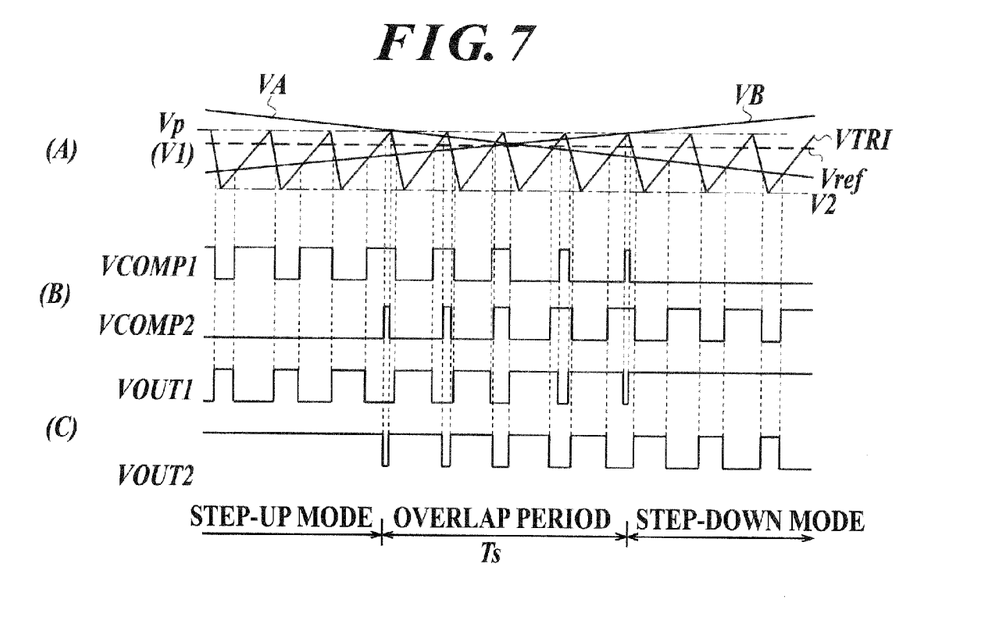
FIG. 7 is a waveform diagram of variations in signals and electric potentials at different sites in a conventional step-up/down DC-DC converter (Patent Document 2)

If an input voltage Vin is lower than a target output voltage, i.e., if a feedback voltage VA is higher than the peak voltage Vp of triangle waves VTRI, as illustrated in FIG. 7, the step-up/down DC-DC converter, which is illustrated in FIG. 6, drives the Q1 and Q2 with PWM pulses while the Q3 is being in a continuous ON state and the Q4 is being in a continuous OFF state to output a voltage Vout obtained by step-up of the Vin. If the input voltage Vin is higher than the target output voltage, i.e., if a voltage VB obtained by inverting the feedback voltage VA with reference to Vref is higher than the peak voltage Vp of the triangle waves, the Q3 and Q4 are driven by PWM pulses while the Q1 is being in a continuous ON state and the Q2 is being in a continuous OFF state to output a voltage Vout obtained by step-down of the Vin.

PRIOR DOCUMENT

Patent Document

Patent Document 1: Japanese Patent No. 3440314
Patent Document 2: Japanese Patent No. 3953443

DISCLOSURE OF THE INVENTION

Problems to be Solved by the Invention

In the step-up/down DC-DC converter such as that illustrated in FIG. 6, an upper-limit voltage V1 defining the peak value of the triangle waves and a lower-limit voltage V2 defining the bottom value of the triangle waves are supplied to a triangle-wave generator circuit TWG that generates triangle waves, and the triangle-wave generator circuit TWG generates triangle waves VTRI using the upper-limit voltage V1 and the lower-limit voltage V2. The triangle-wave generator circuit TWG includes, for example, a charging/discharging circuit that has a constant current source and a capacitor and a comparator that generates switching timing signals of charging/discharging with comparison voltages, i.e., the upper-limit voltage V1 and the lower-limit voltage V2.

In the step-up/down DC-DC converter (FIG. 6) disclosed in Patent Document 2, the inverting amplifier AMP 2 has a reference voltage Vref lower than the peak value Vp of the triangle waves VTRI, as illustrated in FIG. 7A. Under such condition, an overlap period Ts in which the step-up transistors Q1 and Q2 and the step-down transistors Q3 and Q4 are simultaneously turned on/off occurs during the transition from a step-up mode to a step-down mode (or vice versa), increasing the switching loss.

On the contrary, the step-up/down DC-DC converter disclosed in Patent Document 1 directly supplies the upper-limit voltage V1 that is supplied to the triangle-wave generator circuit to an inverting amplifier as a reference voltage. Supply of such an upper-limit voltage V1 as a reference voltage causes the inverting amplifier to generate a voltage FB2 by inversion of the feedback voltage FB1 with reference to the voltage V1 and to supply this to a step-up side PWM comparator, as illustrated in, for example, FIG. 8A. However, direct supply of the upper-limit voltage V1 defining the peak value of the triangle waves as a reference voltage for the inverting amplifier causes the peak value of actual triangle waves to exceed the upper-limit voltage V1 due to delay and other conditions in the comparator of the triangle-wave generator circuit.

Figure 8:
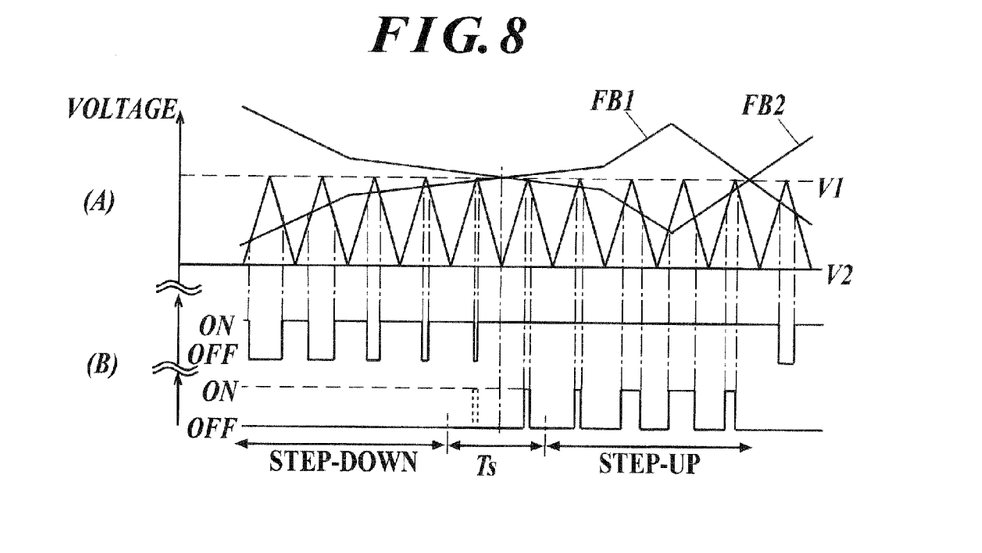
FIG. 8 is a waveform diagram of variations in signals and electric potentials at different sites in a conventional step-up/down DC-DC converter (Patent Document 1).

Even if the DC-DC converter is designed to supply a voltage that equals the peak value, even with a delay in the comparator, to the inverting amplifier as an inverting reference voltage to avoid the failure described above, the reference voltage of an inverting amplifier (AMP2) falls below the peak value of the triangle waves due to production variability in gains of an error amplifier (AMP1) and an inverting amplifier (AMP2), offsets of the amplifiers (AMP1 and AMP2) and comparators (CMP1 and CMP2), and variation in bleeder resisters (R1 and R2), and pulses that turn on the step-up transistor (Q2) at a timing when the transistor (Q2) is not required to be turned on are output, as indicated by the dotted line in FIG. 8B, and an overlap period Ts similar to that in FIG. 7 occurs, causing an increase in switching loss.

An object of the present invention, which has been conceived in light of the issue described above, is to provide a step-up/down DC-DC converter including a circuit generating triangle waves for PWM control of an output voltage, a PWM comparator, and an inverting amplifier inverting a feedback voltage and achieving a reduction in switching loss during a transitional period of the switching of step-up/down so as to improve the power efficiency.

Means for Solving the Problem

In order to achieve the above objects, there is provided a switching control circuit generating to output on/off signals of a first switching device supplying a current to a voltage conversion inductor of a step-up/down DC-DC converter and a second switching device receiving a current from the inductor, the switching control circuit including:

an error amplifier circuit outputting a voltage corresponding to an output voltage from the DC-DC converter;

an inverter amplifier circuit inverting the output from the error amplifier circuit with reference to a predetermined voltage;

a waveform generator circuit generating triangle waves;

a first voltage comparator circuit receiving the output from the error amplifier circuit and the output from the waveform generating circuit;

a second voltage comparator circuit receiving the output from the inverting amplifier circuit and the output from the waveform generator circuit; and a voltage generator circuit generating an inverting reference voltage supplied to the inverting amplifier circuit, wherein the inverting reference voltage supplied to the inverting amplifier circuit is set to an electric potential so as not to fall below the highest electric potential of the triangle waves supplied to the first and second voltage comparator circuits.

With the solution described above, the reference voltage of the inverting amplifier circuit does not fall below the peak value of the triangle waves supplied to the voltage comparator circuit; thus, the switching device controlling the current to the inductor (coil) is prevented from being turned on/off while switching of step-up/down, reducing switching loss so as to improve power efficiency.

Preferably, the inverting reference voltage generated at the voltage generator circuit is set to an electric potential higher than a peak value of the triangle waves generated at the waveform generator circuit, and the potential difference between the inverting reference voltage and the peak value is set based on differences in gain between operational amplifiers of the error amplifier circuit and the inverting amplifier circuit, offsets of the operational amplifiers, and offsets of a first voltage comparator circuit and a second voltage comparator circuit.

The potential difference between the reference voltage and the peak value of the triangle waves is determined based on differences in gain between the operational amplifiers of the error amplifier circuit and the inverting amplifier circuit, causing a reference voltage of the inverting amplifier circuit to fall below the peak value of the triangle waves, offsets in the operational amplifiers, and offsets in the first and second voltage comparator circuits; which can prevent the inverting reference voltage from falling below the peak value of the triangle waves regardless of differences in the gains of the amplifiers and/or offsets in the amplifier and comparator, and can reduce switching loss during the transitional period of the switching of step-up/down.

Preferably, the inverting reference voltage generated at the voltage generator circuit is set to an electric potential higher than the peak value of the triangle waves generated at the waveform generator circuit by at least a variation in feedback voltage due to a difference in gain between operational amplifiers of the error amplifier circuit. Accordingly, the inverting reference voltage of the inverting amplifier circuit is set to a voltage with a potential higher than a variation in the feedback voltage caused by a difference in gain between the operational amplifiers of the error amplifier circuit that is the greatest factor of the reference voltage of the inverting amplifier circuit falling below the peak value of the triangle waves; thus, conditions for preventing the inverting reference voltage from falling below the peak value of the triangle waves can be set relatively easily.

Preferably, when a divider circuit is provided and comprises a bleeder resistor dividing an output voltage from the DC-DC converter and generating a feedback voltage to be supplied to the error amplifier circuit, the potential difference between the inverting reference voltage and the peak value is determined in consideration of a difference in a bleeder resistor of the divider circuit. In this way, an inverting reference voltage that does not fall below the peak value of the triangle wave can be set, regardless of a difference in the resistances of the bleeder resistor generating feedback voltages.

Preferably, a voltage generator circuit generating the inverting reference voltage includes a resistance divider circuit including a plurality of resistors connected in series between a constant voltage terminal receiving a constant voltage and a grounding terminal receiving a grounding potential, and a first voltage from a first node of the resistance divider circuit is supplied to the waveform generator circuit as a voltage defining the peak value of the triangle waves, and a second voltage higher than the first voltage from a second node of the resistance divider circuit is supplied to the inverting amplifier circuit as the inverting reference voltage. Thereby, an inverting reference voltage that does not fall below the peak value of the triangle waves can be generated through a relatively simple circuit.

Preferably, the voltage generator circuit includes a variable voltage source varying a generated voltage, a peak-value detector circuit detecting the peak value of the triangle waves generated at the waveform generator circuit, and a voltage control circuit controlling the inverting reference voltage generated at the variable voltage source in accordance with an output from the peak-value detector circuit. As a result, an inverting reference voltage that does not fall below the peak value of the triangle waves can be generated.

Preferably, a voltage clamp circuit clamping the peak value of the triangle waves supplied from the waveform generator circuit to first and second voltage comparator circuits to an electric potential lower than the inverting reference voltage. The reference voltage of the inverting amplifier circuit does not fall below the peak value of the triangle waves supplied to the voltage comparator circuit by clamping the peak value of the triangle waves to an electric potential lower than the inverting reference voltage; which can prevent the switching device from being turning on/off during switching of step-up/down, reducing switching loss and thus improving the power efficiency.

Preferably, a step-up/down DC-DC converter includes an inductor for voltage conversion; a first switching device supplying a current to the inductor; a second switching device receiving a current from the inductor; a third switching device supplying a current to the inductor while the first switching device is being turned off; a fourth switching device supplying a current from the inductor to an output terminal while the second switching device is being turned off; and a switching control circuit according to one of claims 1 to 6 generating a signal for turning on/off the first to fourth switching devices.

The DC-DC converter accordingly can have reduced switching loss during transition of the switching of step-up/down and exhibit excellent power efficiency.

Advantageous Effect of the Invention

The step-up/down DC-DC converter according to the present invention including a circuit that generates triangle waves for PWM control of an output voltage, a PWM comparator, and an inverting amplifier that inverts a feedback voltage is advantageous in that switching loss during the transitional period of switching of step-up/down can be reduced to improve power efficiency by setting the reference voltage of the inverting amplifier higher than the peak value of the triangle waves, regardless of the difference in gain between the amplifiers and bleeder resistors of the switching control circuit and/or offsets in the amplifiers and comparators.

EMBODIMENT FOR CARRYING OUT THE INVENTION

Preferable embodiments of the present invention will now be described with reference to the drawings.

Figure 1:
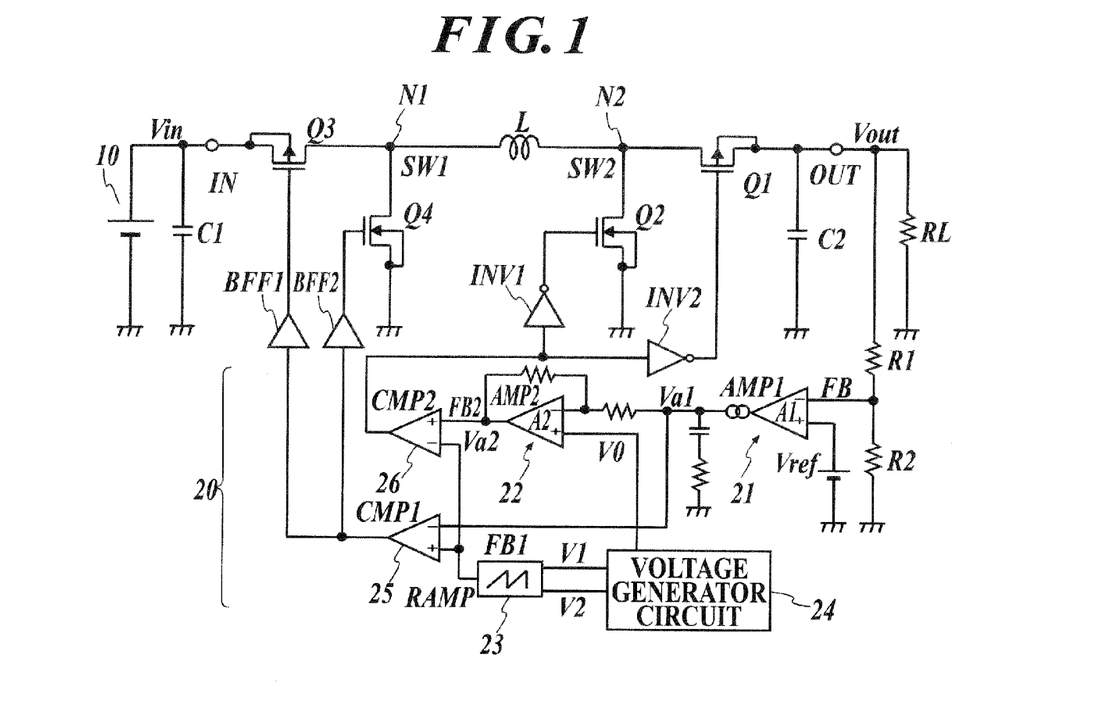
FIG. 1 is a circuit configuration diagram of a step-up/down DC-DC converter according to an embodiment of the present invention.

FIG. 1 illustrates a step-up/down DC-DC converter according to an embodiment of the present invention. The step-up/down DC-DC converter of this embodiment includes MOS transistors (insulated-gate field-effect transistors) Q3 and Q4 that are connected in series between an input terminal IN receiving a DC voltage Vin from a DC source 10, such as a battery, and a grounding point; MOS transistors Q1 and Q2 that are connected in series between an output terminal OUT connected to a smoothing capacitor C2 and a grounding point; and a switching control circuit 20 that outputs signals for turning on/off of the transistors Q1 to Q4. An inductor (coil) L is connected to both a connection node N1 of the MOS transistors Q3 and Q4 and a connection node N2 of the MOS transistors Q1 and Q2. In this embodiment, the MOS transistors Q1 and Q3 used are p-channel MOS transistors while the MOS transistors Q2 and Q4 used are n-channel MOS transistors. RL denotes a load connected to an output terminal that serves as an equivalent resistor, and C1 and C2 denote smoothing capacitors.

The switching control circuit 20 includes bleeder resistors R1 and R2 that divide the output voltage Vout to generate a feedback voltage FB; an error amplifier circuit 21 that outputs a voltage corresponding to the potential difference between the feedback voltage FB and a reference voltage Vref; an inverting amplifier circuit 22 that inverts the output from the error amplifier circuit 21; a waveform generator circuit 23 that generates a serrated waveform signal RAMP as triangle waves for PWM (pulse width modulation) control; a voltage generator circuit 24 that generates an upper-limit voltage V1 and a lower-limit voltage V2 of the waveform signal RAMP generated at the waveform generator circuit 23; a first comparator 25 that receives the waveform signal RAMP from the waveform generator circuit 23 and an output voltage FB1 from the error amplifier circuit 21; and a second comparator 26 that receives the waveform signal RAMP and an output voltage FB2 from the inverting amplifier circuit 22.

The MOS transistors Q1 and Q2, respectively, are turned on/off by inverters INV1 and INV2 that invert the output from the second comparator 26 while Q3 and Q4, respectively, are turned on/off by buffer drivers BFF1 and BFF2 that output signals in the same phase as that of the output from the first comparator 25. A constant voltage V0 that is ΔV higher than the voltage V1 generated at the voltage generator circuit 24 is supplied to the inverting amplifier circuit 22 as an inverting reference voltage.

In the DC-DC converter in FIG. 1, at an input voltage Vin below the target output voltage, the output of the first comparator 25 is maintained at a continuous low level, causing the transistor Q3 to enter a continuous ON state and the Q4 to enter a continuous OFF state, while PWM pulses are output from the second comparator 26 to complementarily turn on/off the transistors Q1 and Q2. While the transistor Q2 is being turned on, energy is accumulated by applying a current to the coil L. When the Q2 is turned off, the Q1 is turned on, and the energy accumulated in the coil L is discharged such that a current is applied to the smoothing capacitor C2. By repeating this, the input voltage Vin is boosted to be output as a voltage Vout.

At an input voltage Vin exceeding the target output voltage, the output of the second comparator 26 is maintained at a continuous low level, causing the transistor Q1 to enter a continuous ON state and the Q2 to enter a continuous OFF state, while PWM pulses are output from the first comparator 25 to complementarily turn on/off the transistors Q3 and Q4. As a result, the input voltage Vin is bucked to be output as a voltage Vout.

As the Vin is boosted to approach the Vout, the output FB2 from the inverting amplifier circuit 22 increases, and the duty of the control pulses reaches 100% (Q1 being constantly on) at Vin≈Vout. When the Vin nears the Vout to establish the relationship Vin>Vout, the state shifts from the 100% ON state of the Q1 to a 99% ON state of the Q3.

Figure 2A:
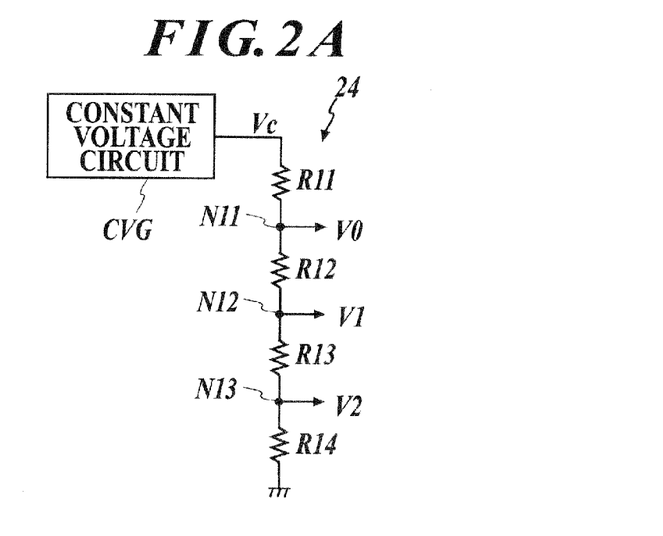
FIG. 2A is a circuit configuration diagram illustrating an example of a voltage generator circuit of the switching control circuit according to the embodiment in FIG. 1.

FIG. 2A illustrates a specific example of the voltage generator circuit 24. As illustrated in FIG. 2A, the voltage generator circuit 24 includes a constant voltage circuit CVG and a resistance divider circuit including resistors R11, R12, R13, and R14 in series that receive a constant voltage Vc generated at the constant voltage circuit CVG; the highest reference voltage V0 is received from the connection node N11 of the resistors R11 and R12; the upper-limit voltage V1 of the waveform signal RAMP is received from a connection node N12 of the resistors R12 and R13; and the lower-limit voltage V2 of the waveform signal RAMP is received from the connection node N13 of the resistors R13 and R14.

Figure 2B:
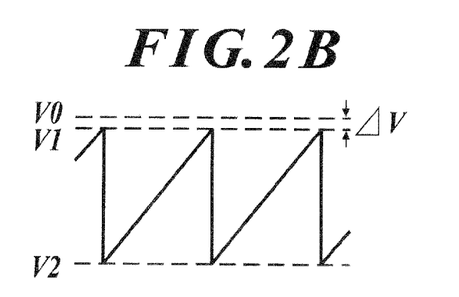
FIG. 2B is a schematic view of the relationship between a voltage generated by the voltage generator circuit and the waveform (triangle waves)

In this way, the reference voltage V0 is always set to be higher than the upper-limit voltage V1 of the waveform signal RAMP, as illustrated in FIG. 2B. The potential difference ΔV between the reference voltage V0 and the upper-limit voltage V1 is set to a desired value by appropriately setting the values of the resistors R11 to R14. Preferably, the ΔV is set such that the relationship V0>Vpeak1 is maintained even when the reference voltage V0 is closest to the peak value Vpeak1 (V1) of the actual waveform signal (hereinafter, referred to as triangle waves) RAMP due to summation of the production variability in the elements of the circuits. The lower-limit voltage V2 may be a grounding voltage (0 V).

Figure 3:
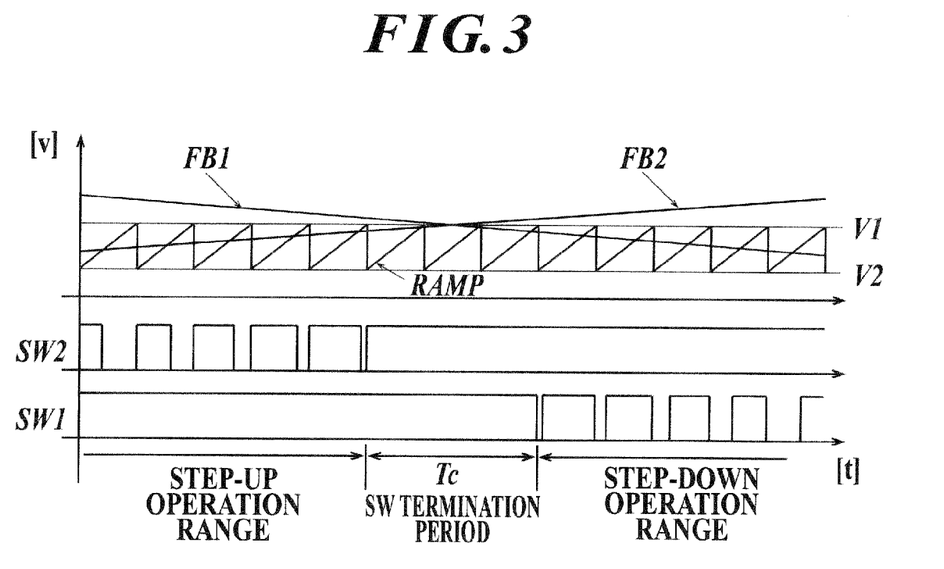
FIG. 3 is a waveform diagram illustrating the operational waveform of the DC-DC converter in FIG. 1.

FIG. 3 illustrates an operating waveform of the DC-DC converter in FIG. 1. In this embodiment, the reference voltage V0 of the inverting amplifier circuit 22 is always ΔV higher than the upper-limit voltage V1 of the waveform signal RAMP; thus, the transition from a step-up mode to a step-down mode (or vice versa) due to an increase in the input voltage Vin during step-up does not generate an overlap period Ts during which the step-up transistors Q1 and Q2 and the step-down transistors Q3 and Q4 are to be turned on/off simultaneously, but does generate a switching termination period Tc during which the p-channel MOS transistors Q1 and Q3 are to enter a continuous ON state while the n-channel MOS transistors Q2 and Q4 are to enter a continuous OFF state. Accordingly, switching loss can be reduced during the transitional period of switching between step-up and step-down, increasing power efficiency.

Next, the process of setting ΔV (=V0−V1) will be described.

With a DC-DC converter having a configuration such as that illustrated in FIG. 1, parameters that must be considered in the determination of the reference voltage V0 to be supplied to the inverting amplifier circuit 22 include DC gains A1 and A2 of amplifiers AMP1 and AMP2 of the error amplifier circuit 21 and the inverting amplifier circuit 22, offsets Voff1, Voff2, Voff3, and Voff4 of the amplifiers AMP1 and AMP2 and the comparators 25 and 26, and resistances of the bleeder resistors R1 and R2. The parameter having the greatest influence is the DC gain A1 of the amplifier AMP1. The relationship of the gain A1 and ΔV is represented in the following expression (1):

$$\Delta V = (\Delta Vout \times R2/(R1+R2))/A1 \quad (1)$$

ΔVout in Expression (1) holds when the transistors Q1 and Q3 are turned on and the Q2 and Q4 are turned off. Since the DC-DC converter in FIG. 1 does not control the Vout, Vout≈Vin holds, causing unsatisfactory regulation. Unsatisfactory regulation is allowable within an output voltage range (or output voltage precision) defined by a specification; hence, ΔVout is preferably determined first in the determination process of ΔV using Expression (1). Once ΔVout is determined, ΔV is determined by Expression (1), and V1 is determined by ΔV=V0−V1. If the determined ΔVout is within the output voltage range, the specification cannot be occasionally satisfied due to differences in parameters not including the DC gain of the amplifier AMP 1; thus, ΔVout is preferably smaller than the output voltage range.

A more precise setting process for ΔV (=V0−V1) will now be described. In the following description, it is presumed that the comparators 25 and 26 have no or negligible delay, i.e., Vpeak1≈V1, where Vpeak1 denotes the peak value of the triangle waves. If the delay in the comparators 25 and 26 is not negligible, i.e., Vpeak1>V1, ΔV can be determined in consideration of Vpeak1−V1.

In consideration of the switching point conditions of the step-down, the step-down stops upon an output Va1 (=FB1) of the error amplifier circuit 21 reaching Vpeak1, as shown in the following relation:

Va1=Vpeak1 . . . Condition 1. If Vout equals Vout1, Condition 1 derives:

Vpeak1=(Vref1−Vout1×R2/(R1+R2))×A1. Transforming the expression gives:

$$Vout1 = (Vref1 \times Vpeak1/A1) \times (R1+R2)/R2.$$

In consideration of the switching point conditions of the step-up, the step-up stops upon an output Va2 (=FB2) of the inverting amplifier circuit 22 reaching Vpeak1, as shown in the following relation:

Va2=Vpeak1 . . . Condition 2. If Va2=2×V0−Va1, the following relation is given:

Vpeak1=2×V0−Va1. Transforming the expression gives:

$$Va1 = 2 \times V0 - Vpeak1 \quad (2).$$

Since the relationship between Va1 and Vout satisfies:

$$Va1 = (Vref1 - Vout \times R2/(R1+R2)) \times A1,$$

Expression (2) derives:

2×V0−Vpeak1=(Vref1−Vout×R2/(R1+R2))×A1. If the output Vout equals Vout2 at this time (under Condition 2), the following relations are given:

$$Va1 = 2 \times V0 - Vpeak1 = (Vref1 - Vout2 \times R2/(R1+R2)) \times A1;$$
and $$Vout2 = (Vref1 - (2 \times V0 - Vpeak1)/A1) \times (R1+R2)/R2.$$

If the difference of Vout1 and Vout2 equals a voltage variable value for a termination period of step-up and step-down, the following relation is satisfied; ΔVout=Vout1−Vout2= (Vref1−Vpeak1/A1)×(R1+R2)/R2−(Vref1−(2×V0−Vpeak1)/A1)×(R1+R 2)/R2=(−Vpeak1+(2×V0−Vpeak1))×(R1+R2)/A1·R2=(V0−Vpeak1)×2(R1+R2)/A1·R2. If V0=Vpeak1+ΔV, the following relation is given: ΔVout=ΔV× 2(R1+R2)/A1·R2.

Since Vout (target output voltage value) includes production variability, the output voltage must be within X % (for example, 2% or 5%) of the target value in consideration of all factors of variations. X % is inclusive of factors of variations such as a difference in gain between the amplifiers AMP1 and AMP2, offsets of the amplifiers and comparators, a difference between the resistors R1 and R2, and a variation in the reference voltage Vref. The output voltage of a conventional step-up/down DC-DC converter conforming to a product standard for merely step-up and step-down may be within X %. The precision of the output voltage of the step-up/down DC-DC converter according to the present invention equals the sum of precisions of the step-up, the step-down, and the step-up/down termination.

Thus, in order to achieve the precision X % set for a conventional product in consideration of merely step-up and step-down in the case where the acceptable error of the output voltage of the conventional product is set to "100", for example, the error must be distributed, i.e., "40" to the step-up, "40" to the step-down, and "20" to the step-up/down termination, and the design must satisfy these output errors such that the total output voltage precision is similar to that of a conventional product.

For example, for an error distribution of "20" during step-up/down termination, ΔV may be set to satisfy the relationship:

$$\Delta Vout = (Vout \times X/100) \times (20/100) = \Delta V \times 2(R1+R2)/A1 \cdot R2.$$

Accordingly, at an output of 3.3 V and a standard value of 2%, the total difference is 3.3×0.02=66 mV. Thus, ΔVout=66×20/100=13.2 [mV]

is satisfied to give ΔV×2(R1+R2)/A1·R2=13.2. If R1=R2 and A1=100 times, then

ΔV=0.33 [V].

The above description is an example distribution for step-up/down termination, and the error distribution of the step-up, the step-down, and the step-up/down termination can be modified through various different procedures so long as the sum is within the precision range, such as "45", "45", and "10" or "33", "33", and "33." Values such as the output voltage Vout, the gain A1 of the amplifier, and the resistors R1 and R2 also vary depending on the system to which they are applied.

Figure 4:
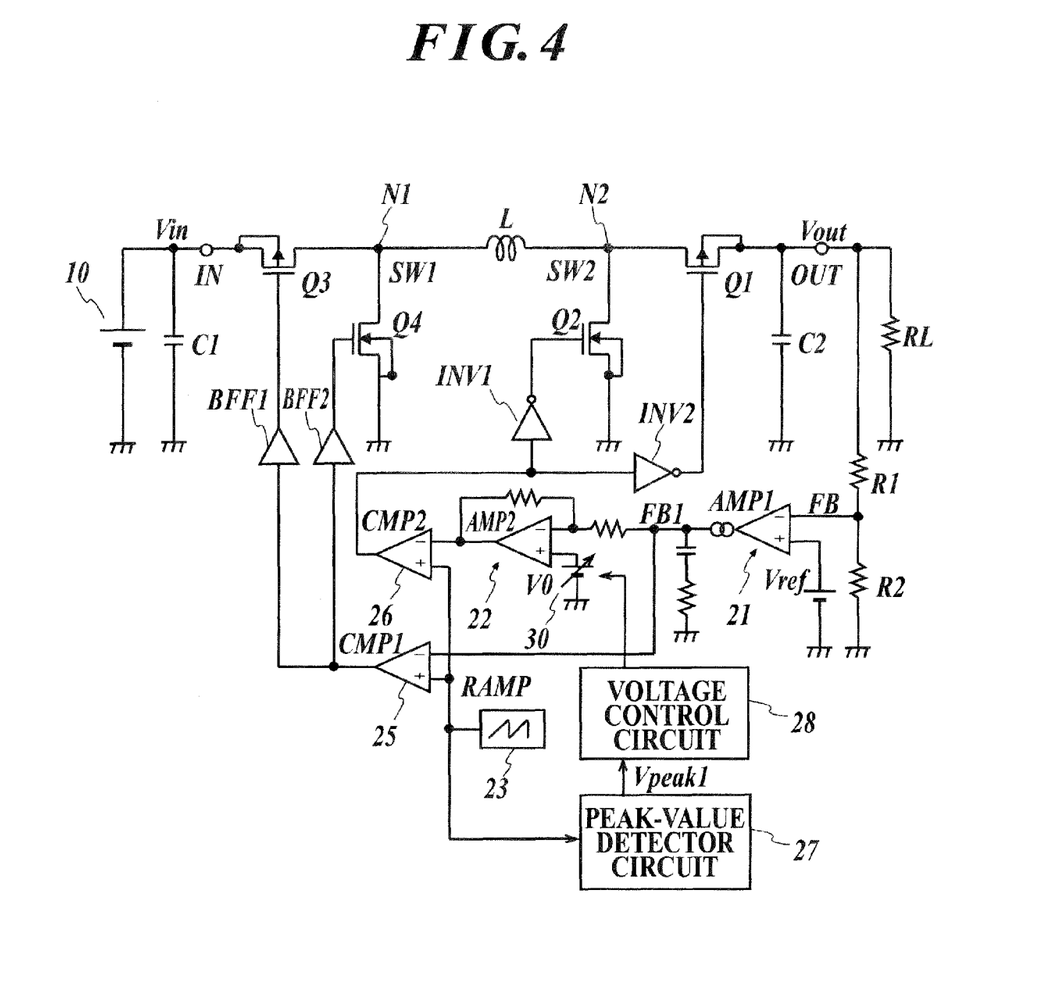
FIG. 4 is a circuit diagram illustrating a step-up/down DC-DC converter according to a second example of the present invention.

FIG. 4 illustrates a step-up/down DC-DC converter according to a second example and including a switching control circuit 20 that generates a voltage constantly higher than the upper-limit voltage V1 of the waveform signal RAMP as a reference voltage V0 of the inverting amplifier circuit 22.

As illustrated in FIG. 4, the switching control circuit 20 according to this example includes a voltage source 30 that serves as a variable voltage source generating a reference voltage V0 to be supplied to an inverting amplifier circuit 22, a peak-value detector circuit 27 that detects the peak value Vpeak1 of triangle waves RAMP, and a voltage control circuit 28 that generates a signal for controlling the voltage of the variable voltage source 30 in response to the output of the peak-value detector circuit 27. In this example also, ΔV=V0−Vpeak1 is set as described in the example above. In this way, a switching termination period (step-up/down termination period) Tc occurs upon transition from a step-up mode to a step-down mode (or vice versa); accordingly, the switching loss can be reduced during the transitional period of switching step-up/down, increasing power efficiency.

Figure 5:
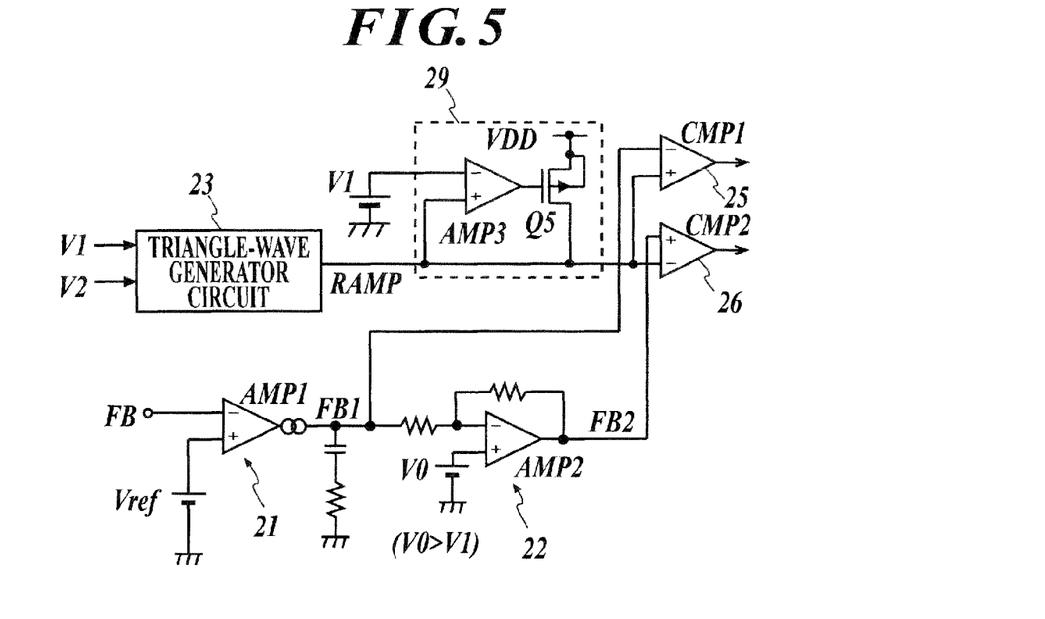
FIG. 5 is a circuit diagram illustrating a switching control circuit of a step-up/down DC-DC converter according to another example of the present invention.

FIG. 5 illustrates a switching control circuit 20 according to a third example. In this example, the reference voltage V0 of the inverting amplifier circuit 22 is designed not to be below the peak of the triangle waves RAMP.

Specifically, a clamp circuit 29 is provided to clamp the peak of the triangle waves RAMP supplied to the comparators 25 and 26 so that the peak does not exceed the reference voltage V0 supplied to the inverting amplifier circuit 22. The clamp circuit 29 includes an operational amplifier AMP3 that, for example, receives a constant voltage V1 (<V0) applied to an inverting input terminal and triangle waves RAMP generated at the triangle-wave generator circuit (waveform generator circuit) 23 and applied to a non-inverting input terminal, and a pMOS transistor Q5 that receives an output from the operational amplifier AMP3 applied to a gate terminal connected to both a source voltage terminal VDD and a signal line transmitting the triangle waves RAMP.

In response to the electric potential of the triangle waves RAMP rising to the constant voltage V1, the operational amplifier AMP3 controls the transistor Q5 such that the clamp circuit 29 having the above-described configuration clamps the triangle waves RAMP so that the peak of the triangle waves RAMP is maintained below the constant voltage V1. In this way, a switching termination period Tc occurs upon transition from a step-up mode to a step-down mode (or vice versa); thereby, switching loss can be reduced during the transitional period of switching step-up/down, increasing power efficiency.

This example is advantageous for a circuit in which the peak value of actual triangle waves is larger than the upper-limit voltage V1 due to, for example, a delay in the comparators in the triangle-wave generator circuit 23. FIG. 5 illustrates a case where the voltage applied to the inverting input terminal of the operational amplifier AMP3 is the same (V1) as the upper-limit voltage supplied to the triangle-wave generator circuit 23. Alternatively, a voltage V1' that satisfies V1<V1'<V0 may be applied to the inverting input terminal of the operational amplifier AMP3.

Detailed descriptions of the invention conceived by the inventors have been described based on the embodiments. The present invention, however, should not be limited to the embodiments. For example, the DC-DC converter of the above-described embodiments includes p-channel MOS transistors as switching devices Q1 and Q3. Alternatively, n-channel MOS transistors may be used. In such a case, the buffer driver BFF1 in FIG. 1 may be replaced with an inverter, whereas the inverter INV1 may be replaced with a buffer driver. Moreover, instead of the MOS transistors Q2 and Q3 in FIG. 1 serving as switching devices, the DC-DC converter may include rectifying diodes.

A serrated wave is used as triangle waves supplied to the PWM comparators (25 and 26) in the DC-DC converter of the above-described embodiments. Alternatively, narrowly-defined triangle waves (see FIG. 8A) that have angled rising edges and angled falling edges may also be used. Furthermore, the above-described embodiments (FIG. 2A) describe a constant voltage circuit CVG serving as the voltage generator circuit 24. The constant voltage Vc divided at the resistance divider circuits (R11 to R14) may be applied from an external unit of the semiconductor integrator circuit.

INDUSTRIAL APPLICABILITY

In the above description, the present invention is applied to a step-up/down DC-DC converter. The present invention, however, should not be limited to the examples and may be widely applied to DC-DC converters that include a waveform generator circuit generating PWM triangle waves and require a voltage corresponding to the peak value of the triangle wave.

DESCRIPTION OF REFERENCE NUMERALS 20 switching control circuit
21 error amplifier circuit
22 inverting amplifier circuit
23 waveform generator circuit (triangle-wave generator circuit)
24 voltage generator circuit
25 first comparator (first voltage comparator circuit)
26 second comparator (second voltage comparator circuit)
27 peak-value detector circuit
28 voltage control circuit
29 clamp circuit
L coil (inductor)
Q1 to Q4 switching device
AMP1 amplifier of error amplifier circuit
AMP2 amplifier of inverting amplifier circuit

The invention claimed is:

1. A switching control circuit generating and outputting on/off signals of a first switching device supplying a current to a voltage conversion inductor of a step-up/down DC-DC converter and a second switching device receiving a current from the inductor, the switching control circuit comprising:
 an error amplifier circuit outputting a voltage corresponding to an output voltage from the DC-DC converter;

an inverting amplifier circuit inverting an output from the error amplifier circuit with reference to a predetermined voltage;
a waveform generator circuit generating triangle waves;
a first voltage comparator circuit receiving the output from the error amplifier circuit and an output from the waveform generating circuit;
a second voltage comparator circuit receiving an output from the inverting amplifier circuit and the output from the waveform generator circuit; and
a voltage generator circuit generating an inverting reference voltage supplied to the inverting amplifier circuit,
wherein the voltage generator circuit comprises:
a variable voltage source varying a generated voltage;
a peak-value detector circuit detecting a peak value of the triangle waves generated at the waveform generator circuit; and
a voltage control circuit controlling the voltage generated at the variable voltage source in accordance with an output from the peak-value detector circuit, and
wherein the inverting reference voltage supplied to the inverting amplifier circuit is set to an electric potential so as not to fall below a highest electric potential of the triangle waves supplied to the first and second voltage comparator circuits.

2. The switching control circuit according to claim 1, wherein the inverting reference voltage generated at the voltage generator circuit is set to an electric potential higher than the peak value of the triangle waves generated at the waveform generator circuit, and a potential difference between the inverting reference voltage and the peak value is set based on variability in gain between operational amplifiers of the error amplifier circuit and the inverting amplifier circuit, offsets of the operational amplifiers, and offsets of the first voltage comparator circuit and the second voltage comparator circuit.

3. The switching control circuit according to claim 2, further comprises a divider circuit which includes a bleeder resistor dividing the output voltage from the DC-DC converter and generating a feedback voltage to be supplied to the error amplifier circuit, wherein the potential difference between the inverting reference voltage and the peak value is determined in consideration of variability in the bleeder resistor of the divider circuit.

4. The switching control circuit according to claim 1, wherein the inverting reference voltage generated at the voltage generator circuit is set to an electric potential higher than the peak value of the triangle waves generated at the waveform generator circuit by at least a variation in feedback voltage due to variability in gain between operational amplifiers of the error amplifier circuit.

5. The switching control circuit according to claim 1, wherein the step-up/down DC-DC converter comprises:
the voltage conversion inductor for voltage conversion;
the first switching device supplying the current to the inductor;
the second switching device receiving the current from the inductor;
a third switching device supplying the current to the inductor while the first switching device is being turned off;
a fourth switching device supplying the current from the inductor to an output terminal while the second switching device is being turned off; and
wherein the switching control circuit generates the on/off signals for turning on/off the first to fourth switching devices.

* * * * *